UNITED STATES PATENT OFFICE.

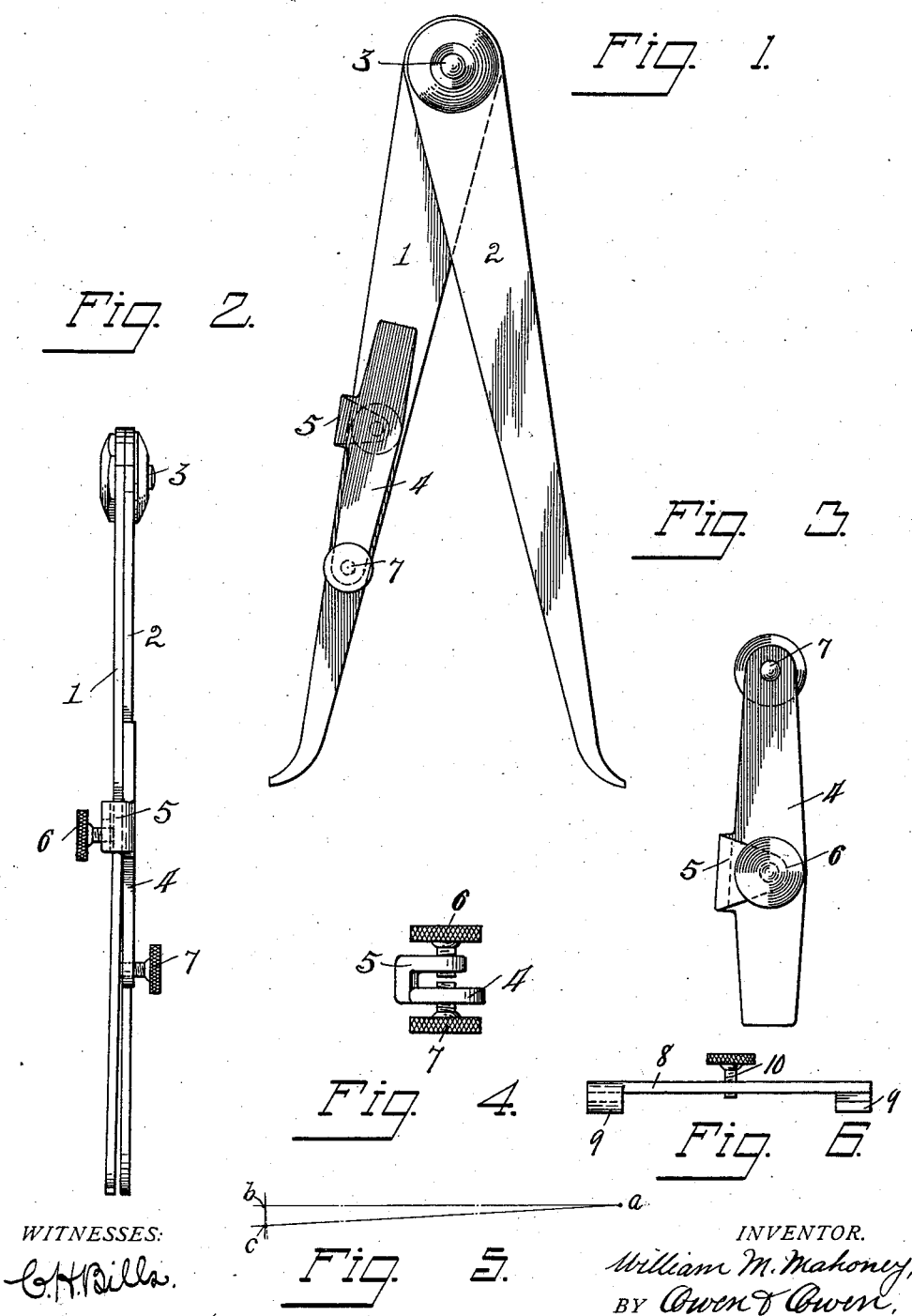

WILLIAM M. MAHONEY, OF TOLEDO, OHIO.

CALIPER ATTACHMENT.

1,015,813. Specification of Letters Patent. Patented Jan. 30, 1912.

Application filed July 31, 1911. Serial No. 641,475.

*To all whom it may concern:*

Be it known that I, WILLIAM M. MAHONEY, a citizen of the United States, and a resident of Toledo, in the county of Lucas and State of Ohio, have invented a certain new and useful Caliper Attachment; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

In the use of both inside and outside calipers considerable difficulty is experienced in securing accurate adjustment of the same for fine work, as the adjustment obtained in the ordinary way usually varies a thousandth or more of an inch.

The object of my invention is to provide a simple attachment for calipers which is operable to effect a lateral springing or adjustment of the free end portion of the caliper leg to which it is attached relative to the other leg to effect a minute varying of the distance between the caliper points, thus enabling a very fine adjustment of the same to be secured.

The invention is fully described in the following specification, and while, in its broader aspect, it is capable of embodiment in numerous forms a preferred embodiment thereof is illustrated in the accompanying drawings, in which,—

Figure 1 is a side elevation of my invention attached to a caliper. Fig. 2 is an edge elevation thereof with the free end of one caliper leg sprung slightly laterally from the plane of the other. Fig. 3 is an enlarged side elevation of the attachment comprising the invention. Fig. 4 is an end view thereof. Fig. 5 is a diagram illustrating an effected adjustment of the legs of a caliper, and Fig. 6 is a modified form of the invention.

Referring to the drawings, 1 and 2 designate the two legs of a caliper which are frictionally hinged together at their inner ends as indicated at 3. The attachment comprising my invention is shown in the present instance as consisting of a bar 4 of iron or other suitable material which is of a stiffer or less resilient nature than the leg of the caliper to which it is to be attached, and has a finger or lug 5 projecting laterally therefrom intermediate its ends and preferably adjacent the rear end thereof and bending back upon the bar in spaced relation thereto. A screw 6 is threaded through the lug 5 in position to bear against the caliper leg in opposition to the bar 4 to coöperate therewith to grip such leg as indicated in Figs. 1 and 2. While I have shown a particular form of clamp, I wish it understood that any suitable means for clamping the bar 4 to a caliper leg may be employed.

An adjusting screw 7 is threaded through the outer end portion of the bar 4, or that which is disposed adjacent the free end of the associated caliper leg, to bear laterally against such leg without the point of clamping of the attachment thereto. It is thus apparent that an inward turning of the screw 7 in contact with the associated caliper leg will effect a lateral springing of such leg relative to the other leg of the caliper whereby to vary the distance between the two points of the caliper, the fulcrum or springing point of the leg to which the bar 4 is attached being at or adjacent the point of clamping of the bar 4 thereto, as indicated in Fig. 2. The adjustment thus effected is better understood by reference to the diagram in Fig. 5 of the drawings. In this diagram the line *a—b* indicates the line in which the caliper points normally stand with the points at the spots indicated thereon. If the point of one leg of the caliper is now to be sprung laterally relative to the line *a—b* any desired distance, as, for instance, to the point *c*, it will be apparent that the line *a—c* or any line which is laterally offset from the point *b* will be greater in length than the line *a—b*, the difference in length of the two lines increasing in proportion to the length of the line *b—c*.

In Fig. 6, which illustrates a slightly different form of my invention, 8 designates the bar member thereof, which is provided at or adjacent to its ends with oppositely projecting lugs 9 for engaging the opposite side of a caliper leg to the body of the bar and has a screw 10 threaded through the central portion thereof for bearing against the associated leg intermediate the lugs 9 and coöperating with the bar and said lugs to effect a bowing of the leg and a consequent springing of the free end thereof relative to the other leg.

In the use of my invention, it is found in practice that a ten-thousandth of an inch adjustment can be secured, thus rendering my attachment of exceptional value for use in the securing of caliper adjustments for fine work.

I wish it understood the lateral adjustment referred to herein has reference to an adjustment of the free ends of the caliper legs at substantially right angles to the opening and closing movements thereof as distinguished from a relative adjustment of the caliper legs upon their pivot; and also that my invention is not limited to any specific construction or to use in connection with any particular form of caliper except in so far as such limitations are specified in the claims.

Having thus described my invention, what I claim as new and desire to secure by Letters Patent, is,—

1. The combination with an instrument of the class described, of means carried thereby and operable to laterally adjust the free end portion of one caliper leg relative to the other.

2. The combination with a caliper, of means capable of being attached to a leg thereof and operable to spring the free end portion of one caliper leg laterally relative to the other leg.

3. The combination with a caliper, of a member clamped to one leg thereof, and adjustable means carried by said member and capable of coöperating therewith to effect a lateral springing of one caliper leg relative to the other.

4. The combination with a caliper, of a bar-like member clamped to one of the caliper legs longitudinally thereof, and means coöperating with said member at a distance from the point of attaching of the member to the leg to effect a lateral springing of the free end of such leg relative to the other.

5. The combination with a caliper, of a bar-like member clamped to one of the caliper legs longitudinally thereof, and a screw threading through said member at a distance from the point of clamping thereof to the caliper leg and capable of bearing against the leg to effect a lateral springing of the free end thereof relative to the other leg of the caliper.

6. The combination with a caliper, of a bar-like member bearing against one side of a caliper leg and having a lug extending laterally therefrom around and spaced apart from the opposite side of the caliper leg, a clamping screw threaded through said lug to clamp the interposed caliper leg in opposition to said member, and a screw threaded through said member at a distance from the point of clamping of the same to the leg and capable of coöperating with said member to effect a lateral adjustment of the free end of the associated leg.

In testimony whereof, I have hereunto signed my name to this specification in the presence of two subscribing witnesses.

WILLIAM M. MAHONEY.

Witnesses:
C. W. OWEN,
E. E. THOMAS.

---

Copies of this patent may be obtained for five cents each, by addressing the "Commissioner of Patents, Washington, D. C."